United States Patent [19]
Hopper

[11] Patent Number: 6,117,045
[45] Date of Patent: Sep. 12, 2000

[54] PRESSURE RATIO CONTROL SYSTEM FOR A CONTINUOUSLY VARIABLE DRIVE UNIT

[75] Inventor: Mark L. Hopper, Ypsilanti, Mich.

[73] Assignee: General Motors Corporation, Detroit, Mich.

[21] Appl. No.: 09/323,408

[22] Filed: Jun. 1, 1999

[51] Int. Cl.[7] .................................................. F16H 59/68
[52] U.S. Cl. ................................. 477/44; 477/46; 474/28
[58] Field of Search ................................ 477/44, 46, 48; 474/28

[56] References Cited

U.S. PATENT DOCUMENTS

| | | | |
|---|---|---|---|
| 4,161,894 | 7/1979 | Giacosa | 477/48 |
| 5,665,022 | 9/1997 | Niiyama | 477/46 |
| 5,961,408 | 10/1999 | König et al. | 474/28 |

*Primary Examiner*—Sherry L. Estremsky
*Attorney, Agent, or Firm*—Laura C. Wideman; Michael J. Bridges

[57] ABSTRACT

A control for a continuously variable unit (CVU) provides control pressures to the variable sheave portions of the CVU pulleys. A first of the pulleys has a direct control pressure and the second of the pulleys has a control pressure proportional to the direct control pressure. The proportional pressure is established by a pair of control valves. One of the control valves issues a bias pressure, proportional to the commanded ratio in the CVU, to the other of the control valves. The other control valve communicates a sheave control pressure, proportional to or equal to the bias pressure, to the second pulley to control the relative position of the variable sheave.

7 Claims, 1 Drawing Sheet

PRESSURE RATIO CONTROL SYSTEM FOR A CONTINUOUSLY VARIABLE DRIVE UNIT

TECHNICAL FIELD

This invention relates to control systems for continuously variable power transmissions and more particularly to pressure control systems for controlling the pressure ratio on the drive sheaves.

BACKGROUND OF THE INVENTION

Many continuously variable drive units (CVU) utilize a pair of spaced adjustable sheaves or pulleys that are drivingly connected by a flexible torque transmitter such as a belt. In most modern CVUs, the belt is metal member comprised of a plurality of metal plates maintained in a continuous loop by a plurality of thin metal bands. These metal belts permit a large amount of torque transfer as compared with conventional rubber V-belts.

The diameters about which the belt is trained on the sheaves determines the transmission ratio between the input and output shafts connected therewith. For example, if the diameters are equal, a one to one ratio is present, if the input sheave diameter is smaller than the output sheave diameter, an underdrive ratio is provided and if the input sheave diameter is greater than the output sheave diameter, an overdrive ratio is presented. During operation, the sheave diameters are controlled to provide a continuously variable ratio as opposed to a step ratio common to most power transmissions. The ratio between the input and output shafts is varied from an underdrive at vehicle launch to an overdrive ratio at cruising speeds.

The ratio between the shafts may be held at any of the available ratios during vehicle operation. The ratio between the sheaves is generally maintained by hydraulic pressure applied to a moveable sheave in each of the pulleys. The pressure is supplied by a control system which maintains a high pressure on one of the pulleys, usually the output pulley, and varies the pressure on the other pulley. At least one prior art control incorporates a position feedback indicator or valve to control the pressure in the input pulley. An electronic control issues a ratio command and the pressure at the input pulley is varied relative to the output pulley until the commanded ratio is present. The feedback indicator informs the control when the commanded ratio is achieved.

Other prior art control use direct pressure control to establish the ratio between the input and output pulleys. The output pulley is pressurized at a level determined by the torque load and the input pulley control pressure is varied in accordance with a look-up table which stores the pressure values for each ratio. The control issues a command to adjust the pressure to provide the calculated pressure for the requested ratio.

While both of these systems will provide a ratio control in a CVU, they both have some disadvantages as to cost and complexity. The position feedback controls require mechanical elements disposed in abutment with the input pulley. These systems also require a mechanical connection between the feedback member and a valve member disposed to control the pressure on the pulley. The direct pressure systems use an electronic processing unit and need sufficient memory space for the tables used by a digital computer for controlling the CVU and software to provide the lookup function. Also the currently available direct pressure control systems do not make non electrical accommodations for fluctuating pressure in the output pulley control pressure which can occur during vehicle operation.

SUMMARY OF THE INVENTION

It is an object of the present invention to provide an improved ratio control for a continuously variable drive unit.

In one aspect of the present invention, a ratio control used a direct pressure control wherein the input or primary pulley pressure is directly related to the output or secondary pulley pressure. In another aspect of the present invention, the primary pulley control pressure is a ratio of the secondary pulley pressure.

In yet another aspect of the present invention, the control pressure at the primary pulley is determined by a pulse width modulated valve having the input pressure thereto equal in value to the pressure at the secondary pulley. In a further aspect of the present invention, the output pressure from the pulse width modulated valve is a percentage of the input pressure and is therefore a ratio of the input pressure.

DESCRIPTION OF AN EXEMPLARY EMBODIMENT

Figure 1:
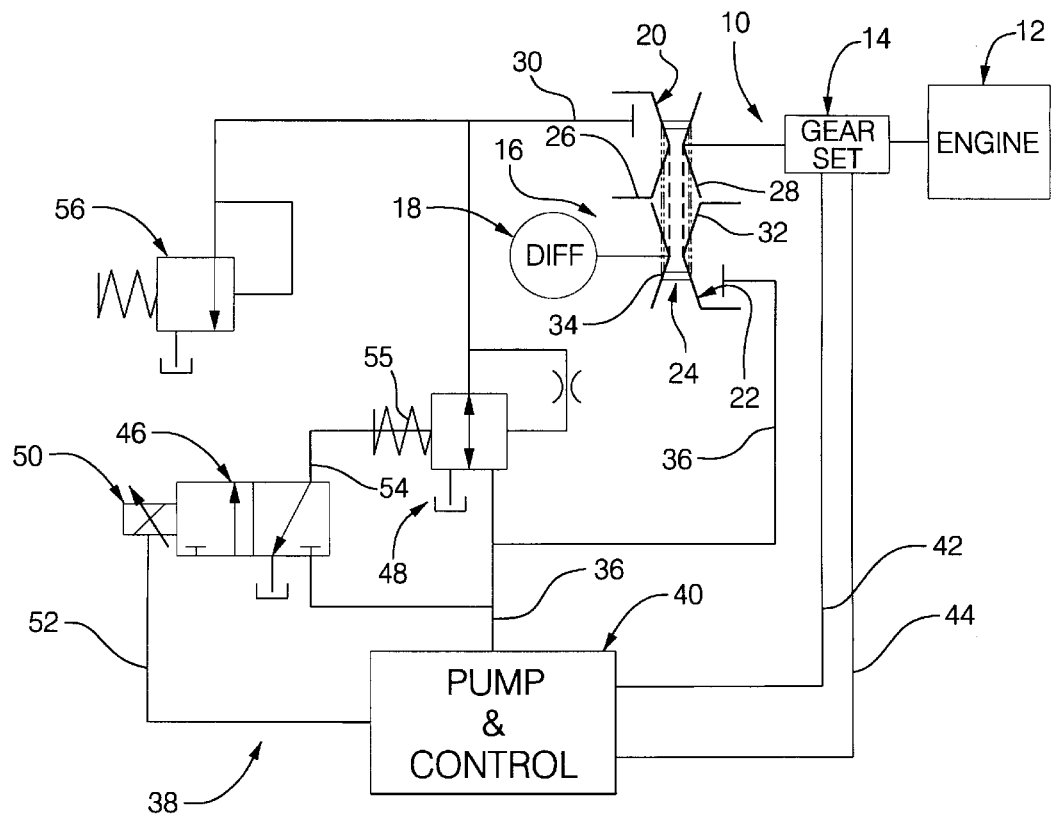
FIG. 1 is a schematic representation of a powertrain having a continuously variable unit and an electro-hydraulic control system incorporating one embodiment of the present invention for controlling the ratio in the continuously variable unit.

A powertrain 10 is comprised of an engine 12, a forward/reverse gear set 14 a continuously variable unit (CVU) 16 and a differential mechanism 18. This type of powertrain is well known. The engine 12 is a conventional internal combustion engine which provide power over a range of speeds. The gear set 14 is preferably a planetary gearing which provides forward and reverse input to the CVU 16. As is well known, the gear set 14 also includes conventional fluid operated friction devices to control the ratio in the planetary gearing.

The CVU 16 has a variable primary or input pulley 20 and a variable secondary or output pulley 22. The primary pulley 20 is drivingly connected with the gear set 14 and the secondary pulley 22 is drivingly connected with the differential 18. The pulleys 20, 22 are drivingly interconnected by a flexible transmitter or belt 24. The belt 24 is preferably a metal push type belt. The belt 24 transmits power from the primary pulley 20 to the secondary pulley 22.

The pulley 20 has a variable sheave 26 which is hydraulically positioned relative to a fixed sheave 28 by hydraulic pressure in a passage 30. The pulley 24 has a variable sheave 32 which is hydraulically positioned relative to a fixed sheave 34 by hydraulic pressure in a passage 36. The sheaves 26 and 32 each have a control chamber with the control chamber of the sheave 26 being twice as large as the control chamber of the sheave 32. The structure of variable sheaves and the pressure chambers thereof are well known to those skilled in the art of CVU construction. The CVU 16 and gear set 14 may be constructed in accordance with many of the well-known variable ratio transmissions such as those described in U.S. Pat. No. 4,644,820 issued to Macey et al on Feb. 24, 1987 and U.S. Pat. Nos. 5,803,858 and 5,803,859 both issued to Haka on Sep. 8, 1998 and assigned to the assignee of this application. The pressure at the pulleys 20, 22 positions the belt 24 to thereby establish the transmission ratio between the pulleys 20, 22. The ratio between the pulleys 20, 22 is continuously variable through a predetermined range by adjusting the respective drive diameters of the pulleys 20, 22 with the hydraulic pressure.

The passages 30 and 36 are components in an electro-hydraulic control system generally designated 38. The control system 38 has a positive displacement pump and electro-hydraulic control 40. The control 40 can include a conventional central processing unit and preprogrammed digital computer, not shown, which controls a plurality of valve mechanisms, not shown. The valve mechanisms provide maximum system pressure and pressure to the gear set 14 through passages 42 and 44. The control system 38 determines which gear ratio will be selected in the gear set 14 and the pressure level in the passage 36.

The passage 36 is also in fluid communication with a pulse width modulated (pwm) control valve 46 and pressure control valve 48. The pwm valve 46 has a pwm control solenoid 50 which receives electrical signals from the control 40 through a wire 52. The electrical signals provide a duty cycle to the pwm solenoid 50 which determines the output pressure of the valve 46 which is distributed to a control pressure passage 54. As is well known with pwm solenoids, a control pressure proportional to the duty cycle is provided. The duty cycle operates between zero and one hundred (100%) percent. Thus, the output pressure is a percentage of the input pressure. In this instance, the pressure is passage 54 is a percentage of the pressure in passage 36 which is equal to the control pressure at the secondary pulley 22.

The pressure control valve 48 is a pressure regulating valve which receives input pressure via passage 36 and delivers a regulated pressure to passage 30. The valve 48 has a bias spring 55 which urges the valve to an open position to ensure a minimum pressure is always present in the passage 30. The pressure in passage 30 is communicated with the valve 48 to urge the valve toward a closed or reduced pressure condition. Thus, the output pressure the valve 48 is regulated by a downstream pressure.

The bias pressure, in passage 54, is created by the valve 46 as described above. The pressure in passage 54, which is proportional to the pressure in passage 36, is communicated to the valve 48 to urge the valve 48 to an open or higher pressure position. The bias pressure on the valve 48 is proportional to the input pressure in passage 36 such that the output pressure of the valve 48 in passage 30 is proportional to the pressure in passage 36. The control pressure at the pulley 22 is equal to the pressure in the passage 36 and the control pressure at the pulley 20 is equal to the pressure in the passage 30.

Since the pressures in the passages 36 and 30 are proportional, the squeezing forces on the pulleys 22 and 20 are proportional. The drive ratio between the pulleys 20 and 22 is established by the control pressures and therefore, with the present invention, the ratio between the pulleys 20 and 22 is controlled by the valves 50 and 48. The pressure in passage 36 is determined by the control 40. The control 40 will establish the pressure in the passage 36 is accordance with vehicle and engine operating parameters. The control 40 uses data including engine speed, input torque and vehicle speed, to name a few, to establish the pressure in the passage 36. Any changes in the pressure in the passage 36 will be immediately reflected in the pressure in the passage 30 such that the desired ratio will be maintained in the CVU.

The passage 30 is also in fluid communication with a pressure limit valve 56. The valve 56 will prevent the variable sheave 26 of the pulley 20 from being subjected to unusually high pressure. The pressure at which the valve 56 will provide pressure relief is beyond the normal range of control pressures for the sheave 26.

As discussed above, the pressure level at the pulley 22 is substantially determined by the amount of torque to be transferred by the CVU. The pressure level at the pulley 20 is determined by the ratio required to provide the commanded vehicle speed. The present invention insures that the pressure ratio between the pulleys 20 and 22 will be at the required proportion to establish the desired drive ratio in the CVU without affecting the system pressure requirement at the pulley 22. It should be noted that the ratio of the control chambers of the sheaves 26 and 32 is such that when the pwm control solenoid 50 is operating at a duty cycle of one hundred percent, the CVU ratio will be a two to one overdrive ratio.

Figure 2:
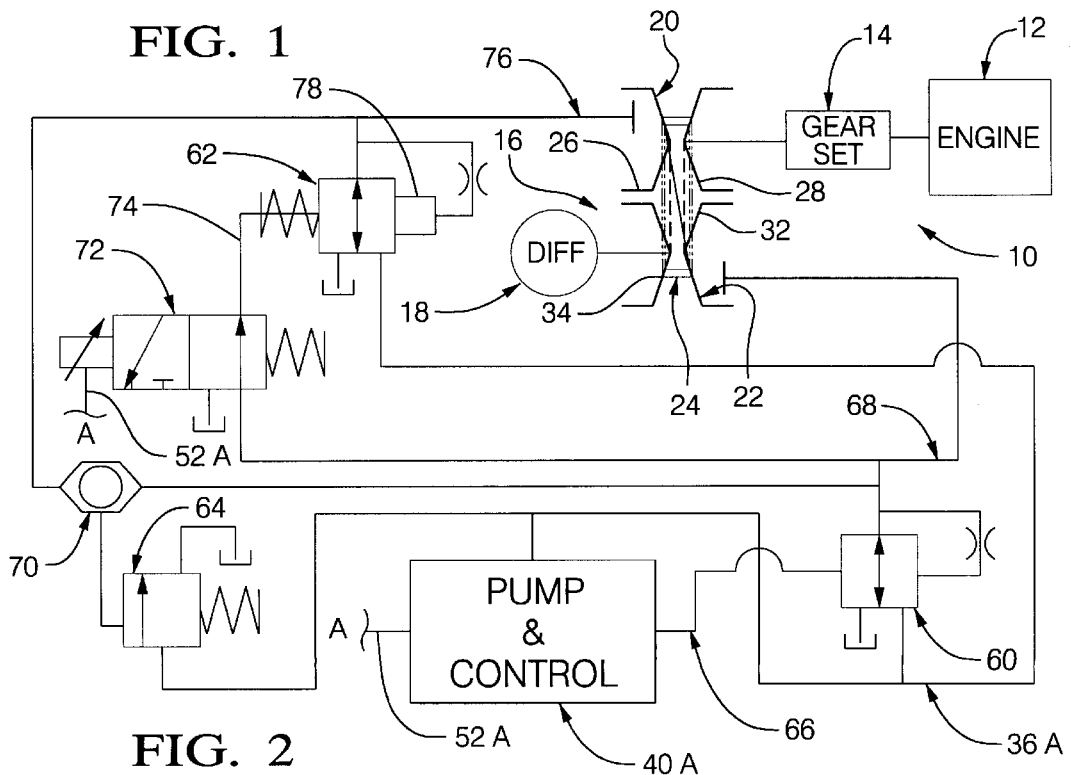
FIG. 2 is a schematic representation of a powertrain having a continuously variable unit and an electro-hydraulic control system incorporating another embodiment of the present invention for controlling the ratio in the continuously variable unit.

The schematic representation shown in FIG. 2 includes the powertrain 10 including the engine 12, the gear set 14, the differential 18 and the CVU 16 comprised of the pulleys 20 and 22 and the belt 24. A control system 38A has pump and control 40A which supplies line pressure to a main passage 36A. The main passage 36A is connected with secondary pulley signal valve 60, a primary pulley control valve 62 and a pressure limit valve 64. The valve 60 is connected to the control 40A through a bias signal passage 66 which transmits a pressure signal proportional to the input torque to the CVU 16. The valve 60, which is essentially a downstream regulator valve, regulates the pressure in a secondary pulley passage 68 in accordance with the pressure in the passage 36A. The pressure is passage 68 is proportional to but less than the pressure in passage 36A.

The secondary pulley passage is in fluid communication with the variable sheave 32, a ball shuttle valve 70, and a pwm control valve 72. The ball shuttle valve 70 communicates with the pressure limit valve 64. The pwm control valve 72 communicates a control pressure to a control passage 74 which is connected with a control area, not shown, on the control valve 62. As described above for the valve 46, the pwm control valve 72 receives a duty cycle signal through a wire 52A from the control 40A. The valve 72 then outputs a pressure signal to the passage 74 proportional to the input pressure of the valve 72, which is the pressure in the secondary pulley passage 68.

The primary pulley control valve 62 provides a control pressure to the variable sheave 26 of the pulley 20 through a passage 76. The passage 76 is also connected with the shuttle valve 70. As is well known, the ball shuttle valve 70 will supply the highest of the pressures in the passages 76 and 68 to the system pressure limit valve 64 such that the system pressure cannot exceed the higher of these two pressures.

The pressure in passage 76 is also communicated to a control port 78 on the control valve 62. The port 78 supplies a control area, not shown, in the valve 62 with a pressure equal to the control pressure in the primary pulley 20. The area pressurized by the pressure in passage 76 is equal to one-half the area pressurized by the fluid in the control passage 74. Thus, the output pressure of the valve 62 in the passage 76 will be equal to twice the pressure in the passage 74.

When the pwm solenoid is operated at a fifty percent duty cycle, the pressure in the passage 74 will be equal to one-half the pressure in the passage 68. However, the pressure in the passage 76 will be equal to the pressure in the passage 68 such that the control pressures at the variable sheaves 32 and 26 will be equal and the ratio of the CVU will be one to one. As the duty cycle at the pwm increases, the pressure at the variable sheave 26 will increase relative to the pressure in the passage 68. This will place the CVU 16 in overdrive ratios when the duty cycle is between 50% and 100%. This will permit the pressure chambers of the pulleys 20 and 22 to be equal as compared to the system described in FIG. 1, where the pressure chamber of the pulley 20 is twice the area of the pressure chamber of the pulley 22.

What is claimed is:

1. A control for establishing a drive ratio between a primary pulley and a secondary pulley in a continuously variable unit, said control comprising:

a source of pressurized hydraulic fluid;

passage means for communicating a first pressure level of pressurized hydraulic fluid to the secondary pulley, a first pressure control valve and a second pressure control valve;

said first pressure control valve communicating a control pressure at a second pressure level of pressurized fluid proportional to said first pressure level to said second pressure control valve; and said second control valve communicating an operating pressure at a third pressure level proportional to said first pressure level to said primary pulley for controlling a drive ratio between said primary and secondary pulleys proportional to the ratio of said first pressure level to said third pressure level.

2. A transmission and control comprising:

a continuously variable unit having a first adjustable pulley and a second adjustable pulley;

an electro-hydraulic control having a source of fluid pressure at a first pressure level;

passage means communicating fluid pressure at said first pressure level to said first adjustable pulley, a control valve and a regulator valve;

said control valve issuing a bias control pressure to said regulator valve; and said regulator valve issuing a pressurized fluid to said second pulley at a second pressure level responsive to said bias control pressure and being proportional to said first pressure level to control a ratio between said first and second pulleys at a value substantially equal to the ratio of said first pressure level of pressure to said second pressure level.

3. The transmission and control defined in claim 2 further comprising:

said bias control pressure being at a level substantially equal to said second pressure level.

4. A control for establishing drive ratios between a primary pulley and a secondary pulley in a continuously variable unit, said control comprising:

a source of pressurized hydraulic fluid;

passage means communicating with said source for conducting a first pressure level of pressurized hydraulic fluid to the secondary pulley, to a first pressure control valve and to a second pressure control valve;

said first pressure control valve communicating a control pressure at a second pressure level of pressurized fluid proportional to said first pressure level to said second pressure control valve; and said second pressure control valve communicating an operating pressure at a third pressure level proportional to said first pressure level to said primary pulley for controlling the drive ratio between said primary and secondary pulleys.

5. The transmission and control defined in claim 4 further comprising:

said source of pressurized fluid comprising a third pressure control valve means for reducing said pressurized fluid prior to conduction to the first adjustable pulley and said first pressure control valve.

6. The transmission and control defined in claim 5 wherein said second pressure control valve presents a control pressure level to the second adjustable pulley that is equal to a control pressure at the first adjustable pulley when the ratio between the pulleys is one to one.

7. The transmission and control defined in claim 4 wherein said second pressure control valve presents a control pressure level to the second adjustable pulley that is equal to a control pressure at the first adjustable pulley when the ratio between the pulleys is at a maximum overdrive ratio.

* * * * *